Aug. 1, 1933.     R. W. SCHUCK ET AL     1,920,326
VERTICAL OIL BEARING

Filed Jan. 30, 1930

INVENTORS
John L. Brown and
Raymond W. Schuck
BY
ATTORNEY

Patented Aug. 1, 1933

1,920,326

UNITED STATES PATENT OFFICE 1,920,326

VERTICAL OIL BEARING

Raymond W. Schuck, Homewood, and John L. Brown, Verona, Pa., assignors to Westinghouse Electric and Manufacturing Company, a Corporation of Pennsylvania Application January 30, 1930. Serial No. 424,552

2 Claims. (Cl. 308—187.)

Our invention relates to vertical bearings and more particularly to lubricating systems for such bearings.

Antifriction bearings must have small amounts of oil to prevent excessive wear but, if too much oil is supplied, serious heating of the bearing may ensue which will be detrimental to the bearing and also will oxidize the oil. The oxidized oil may, in turn, do further injury to the bearing and lubricating system.

In order to avoid over heating, because of too great a quantity of oil in the bearing, various rotating splash systems have been devised for supplying oil to the bearing from a sump or chamber below it.

Prior to our invention vertical bearings of this type have been generally unsatisfactory, both from the standpoint of the amount of oil supplied and from the standpoint of control of the quantity of oil in the sump.

There has been no satisfactory way to control the amount of oil fed to the bearing by the splasher, and, consequently, the bearing service has been uncertain and annoying.

From the control point of view, the rotary splashers heretofore used frequently set up a rotary motion of the oil in the sump which caused the oil to pile up at its periphery, under the centrifugal action.

If the attendant should inspect the oil condition indicated by the gage when the bearing was at rest, he would fill the sump to the desired level, then, when the centrifugal action was resumed, the oil would overflow and be lost.

Many of the systems also entrapped a large quantity of oil in the lubricating devices. In this case, the gage would appear quite empty, and fresh oil would be supplied. Then, when the machine was stopped, the oil would drain back into the sump and cause the same to overflow, thereby often causing great damage.

In both of the above mentioned systems, there is a high maintenance cost because of the constant loss of oil, in addition to the damage caused by the overflow.

We have eliminated both of these disadvantages by providing a simple and positive means for regulating the amount of oil fed to the bearing and by providing a baffle to prevent disturbance of the main body of the oil in the sump, so that the oil level is not disturbed. Therefore, the gage will show the exact level of the oil in the sump.

It is an object of our invention to provide an improved oil bearing.

It is a further object to provide an improved lubricating system for such bearings.

It is a still further object to provide an oil-throwing element for such systems.

Other objects and advantages of our invention will be apparent from the following specification, taken in conjunction with the annexed drawing, in which.

Figure 1:
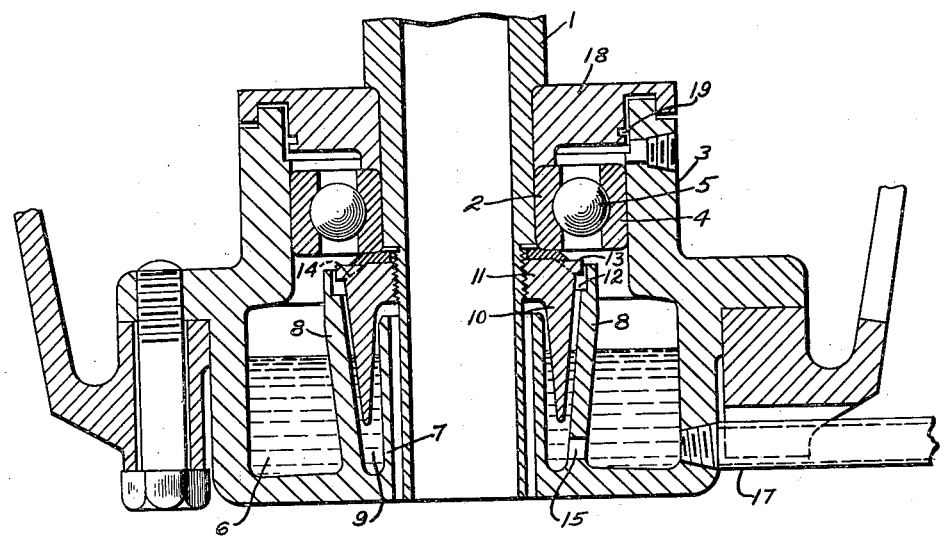
Figure 1 is a vertical sectional elevation of our improved bearing.
Figure 2:
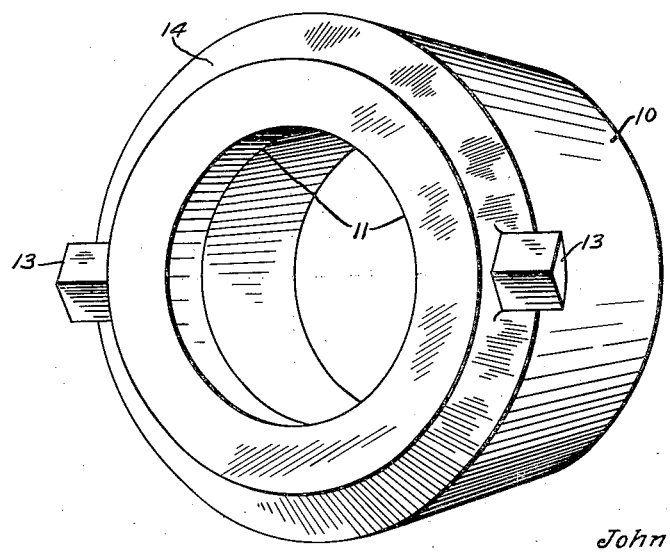
Fig. 2 is a perspective view of our improved oil-throwing element.

The apparatus disclosed in the drawing comprises a vertical shaft 1 carrying an inner race-way 2. A bearing-housing 3 carries an outer race-way 4, there being an antifriction element 5 between the inner and the outer race-ways. In the bottom of the casing 3 is provided an oil chamber or sump 6 having an upstanding cylindrical flange or sleeve 7 adjacent to the shaft 1 to prevent oil leaking along its surfaces. Spaced from the flange 7 is an upstanding flaring baffle 8 forming an annular chamber between it and the flange 7.

Dipping into the oil in the annular chamber is an oil elevator which comprises a frusto-conical element 10 suspended from a collar 11 rigidly attached to the shaft 1. Upon rotation of the shaft 1 and the collar 11, the element 10, depending therefrom, agitates the oil in annular chamber 9 and causes the same to rise in the narrow space between the baffle 8 and the impeller 10, by centrifugal action in the ever increasing diameter of the space between the impeller and the outwardly flaring baffle.

The baffle 8 has an off-set portion 12 at its upper end to provide an enlarged space between the baffle and the end of the collar 11.

Rigidly attached to the collar 11 are oil-throwing elements 13 adapted to rotate in the enlarged space provided by the off-set 12. The elements 13 are provided with oil-throwing or scooping surfaces that slope in opposite directions so that these elements operate regardless of the direction of rotation of the shaft. The top of the collar 11 is provided with a bevel 14, at its outer peripheral edge, to prevent the frusto-conical member from acting as an oil-throwing element. The baffle 8 is provided with a small opening or passage 15 which is made sufficiently small to control the flow of oil from the main oil chamber into the annular chamber 9. The control of the oil flow into the annular chamber 9 limits the amount of oil that can be raised by the impeller 10 and, consequently, limits the amount of oil that can be handled by the oil throwers 13. In this manner, the supply of oil to the bearing is readily controlled, regardless of speed, by controlling the size of the passage 15.

In the casing 3, at some convenient point, is provided an oil-inlet passage 17 through which fresh oil may be supplied to the sump. At the outer end of the passage 17 is attached a gage of any desired type (not shown).

The top of the housing is preferably provided with a sealing or closure member 18 having an oil-sealing groove 19. The operation of my device is as follows:

The chamber 6, having been filled to the desired level with oil, the rotation of the shaft 1 causes the oil to rise between the impeller element 10 and the baffle 8. The rising oil fills the enlarged passage between the baffle 8 and the collar 11. From this point, the oil is thrown into the bearings by the oil throwers or scoops 13, the amount of oil being controlled by the size of the passage 15 in the baffle 8.

The circulating oil returns to the sump by dripping from the bottom of the outer bearing member 4 on which it is deposited by the centrifugal action.

The baffle 8 prevents agitation of the oil in the chamber 6 so that there is no tendency of the oil in the chamber to be misplaced or to have any other level than that actually produced by the amount of oil in the chamber. The level shown in the gage is an accurate indication as to the level of the oil in the oil system and, consequently, enables the attendant to keep the oil at any desired level.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. In a lubricating system, a disk-like body, a converging frusto-conical member depending from the outer circumference of the disk-like body and a plurality of oil-thrower elements attached to the disk-like body and projecting beyond the upper extremity of the depending member, the oil-thrower elements having oil-throwing surfaces diverging outwardly and downwardly from their centers.

2. A lubricated vertical bearing comprising a bearing housing, an oil chamber in the bottom thereof, an upstanding sleeve adjacent the shaft to prevent oil leakage along the shaft, a baffle spaced from the sleeve and diverging therefrom, an outer bearing member in the top of the housing, an inner bearing member on the shaft, anti-friction members between the inner and the outer bearing members, sealing means for the top of the housing above the bearing members, a collar having an upper beveled edge, a converging impeller means depending from the collar and in close proximity to the baffle, the baffle having an offset near the top to provide a space of greater width between the baffle and the impeller, and oil-throwing means attached to the collar and operating in the enlarged space between the impeller and the baffle.

RAYMOND W. SCHUCK.
JOHN L. BROWN.